July 14, 1970     H. SPANGER     3,520,636

CONTROL MECHANISM FOR HELICOPTERS

Filed Nov. 7, 1968     3 Sheets-Sheet 1

Inventor:
HERBERT SPANGER
BY

Inventor:
HERBERT SPANGER

United States Patent Office

3,520,636
Patented July 14, 1970

1

3,520,636
CONTROL MECHANISM FOR HELICOPTERS
Herbert Spanger, Bremen, Germany, assignor to Vereinigte Flugtechnische Werke Gesellschaft mit beschrankter Haftung fruher "Weser" Flugzeugbau/ Focke-Wulf/Heinkel-Flugzeugbau, Bremen, Germany
Filed Nov. 7, 1968, Ser. No. 774,032
Int. Cl. B64c 27/70
U.S. Cl. 416—112                              6 Claims

ABSTRACT OF THE DISCLOSURE

A control device for helicopters with a manually operable and an automatically operable control system for the blade adjustment of the rotor by a swash plate which includes a fluid valve controlled hydraulic control motor operatively connected to said swash plate while the housing of the fluid valve is movable and operatively connected to a control stick forming part of the manual control system.

---

The present invention relates to a control device for helicopters with a manual and an automatic control part for the adjustment of the blade angle by means of the swash-plate the adjusting linkage of which has its central portion linked to a two-arm balance lever. One end of said balance lever has linked thereto the manual control part whereas the other lever end has linked thereto the automatic control part.

Without a special device, especially single rotor helicopters have the undesired property that they are dynamically unstable. This instability may reach such a magnitude that the pilot has difficulties to maintain the balance of the aircraft, especially for a longer period of time. The reason for this unstable behavior is to be found in the considerable uplifting moments about the center of gravity of the airplane which moments are caused by the changes in the so-called "flapping angle" (Schlagwinkel) of the rotor. By flapping angle is meant the angle of inclination of the entire plane of rotation of the rotor with regard to the axis of rotation of the rotor. The changes in the flapping angle, i.e. the unintended changes, are caused by disturbing forces, as for instance gusts of wind acting upon the rotor from the outside. Various means are known to eliminate this great dynamic instability either completely or at least to a considerable extent. One of these known means of improving the dynamic behavior of a helicopter consists in causing the flapping angle of its rotor to disappear in any flight position. This is generally effected by means of a swash-plate which is built into the rotor head and which oil-hydraulically brings about a periodic blade adjustment of the rotor blades. The swash-plate is adjusted in conformity with the so-called zero method until the flapping angle has disappeared. A suitable device has a measuring rod which indicates the flapping angle and which is mechanically connected to the control piston of the control valve. The valve conveys an oil flow under pressure to one or the other side of the piston of a piston control motor. The piston in turn is mechanically connected to the swash-plate and adjusts the latter until the flapping angle of the rotor has been reduced to zero. Inasmuch as a disturbing factor may act from any direction upon the rotor, especially at low flight speed, the control elements and the working elements are advantageously doubly offset by 90° for action upon the swash-plate so that an action can be exerted in any direction. Inasmuch as the above-described control or adjustment is effected independently of the pilot, it will henceforth be designated as automatic control or automatic adjustment.

2

However, it is a matter of course that there must also exist a manual control of the helicopter to be effected by the pilot. To this end, it is well known to employ the method of a periodic blade adjustment. A swash-plate is connected to the control stick for the pilot either directly or through amplifying means. This applies to the longitudinal control as well as to lateral control. An adjustment of the control stick brings about a tilting of the swash-plate and thereby a periodic adjustment of the rotor blades and an inclination of the plane of rotation of the rotor which means a flapping angle in the same direction as the movement of the control stick. By inclining the plane of rotation of the rotor, the control forces and control moments desired by the pilot will result about the longitudinal and lateral axis.

U.S. Pat. 3,050,276 discloses a control device for helicopters which comprises means for a manual control and an automatic control. The manual control operation and the automatic control are effected by means of a blade adjustment of the rotor, and both operations are conveyed to the rotor by means of a common swash-plate. Such a device requires a servo-device for operation which servo-device operates as automatic control device and acts upon the rotor separately from the manual control whereby the entire arrangement becomes relatively uneconomical. Furthermore, the device set forth above is easily susceptible to disturbances so that a continous checking is necessary.

It is, therefore, an object of the present invention to provide a control mechanism for helicopters which will effect the transfer of the above-mentioned automatic control and manual control by one and the same swash-plate independently of each other and at the same time.

It is another object of this invention to provide a control mechanism as set forth in the preceding paragraph, according to which with any position of the control stick selected by the pilot and required by the flight condition, the stabilizing effect of the automatic control will be maintained and effective.

It is still another object of this invention to provide a control mechanism as outlined in the preceding paragraphs, according to which the automatic control will start with the inclining movements of the rotor axis and the control will be effected with simple and reliable means.

These and other objects and advantages of the invention will appear more clearly from the following specification in connection with the accompanying drawings, in which.

Figure 3:
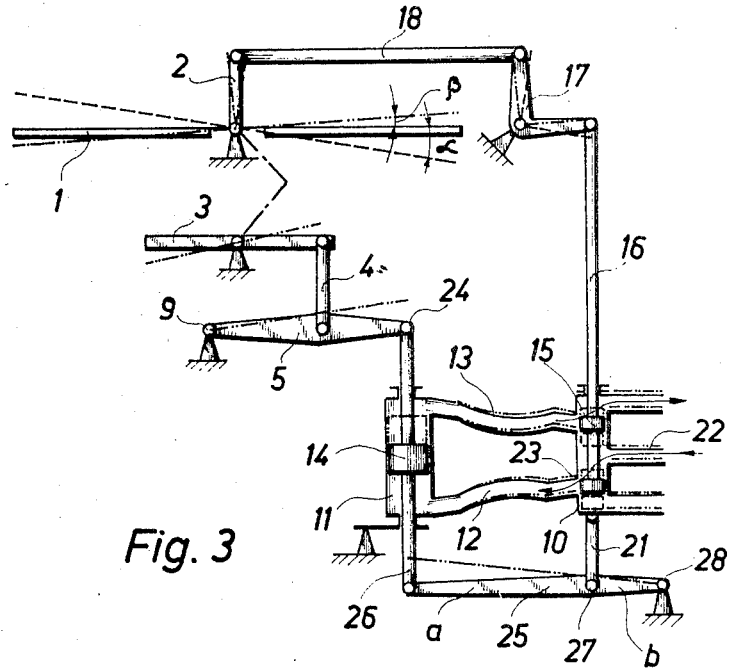

FIG. 3 diagrammatically illustrates the overcontrolled design of the control device.

Figure 1:
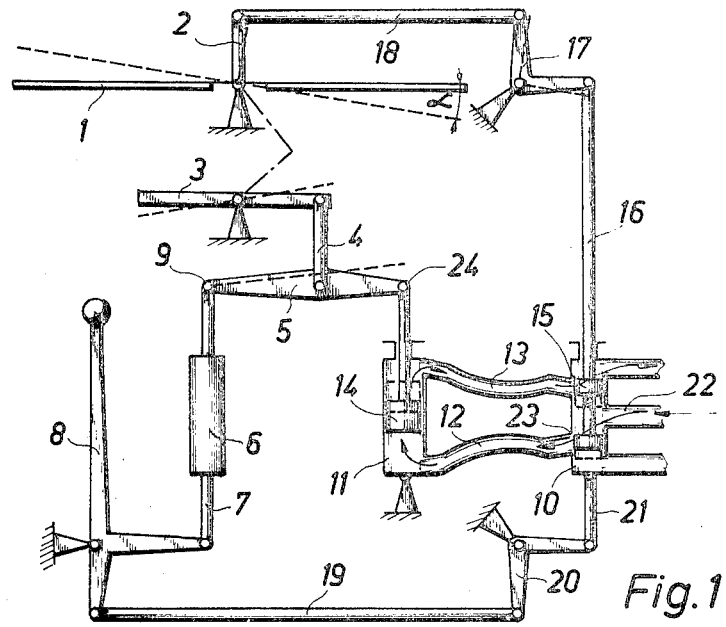
FIG. 1 is a diagrammatic illustration of a control device according to the invention.
Figure 4:
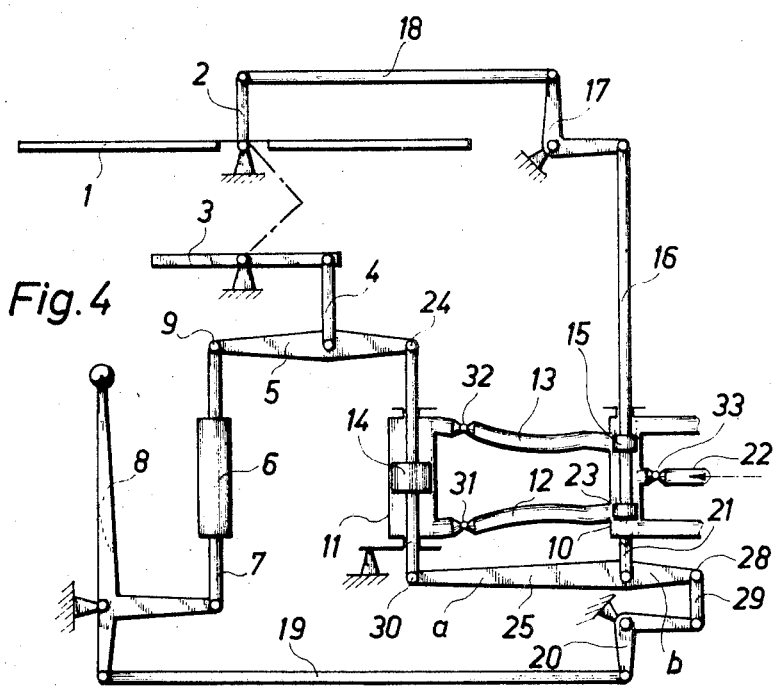

FIG. 4 shows a combination of the arrangements of FIG. 3 and FIG. 1.

Figure 5:
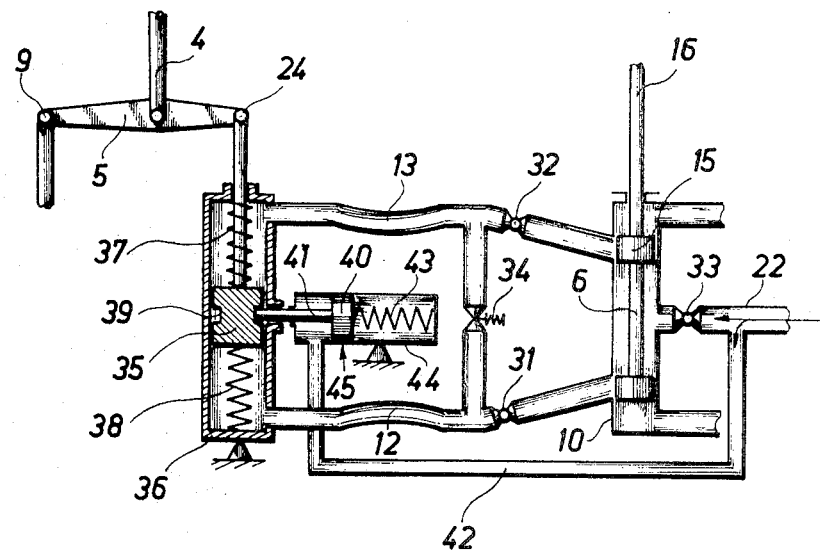

FIG. 5 shows a safety device for use in connection with the arrangements according to FIGS. 1–4.

Figure 2:
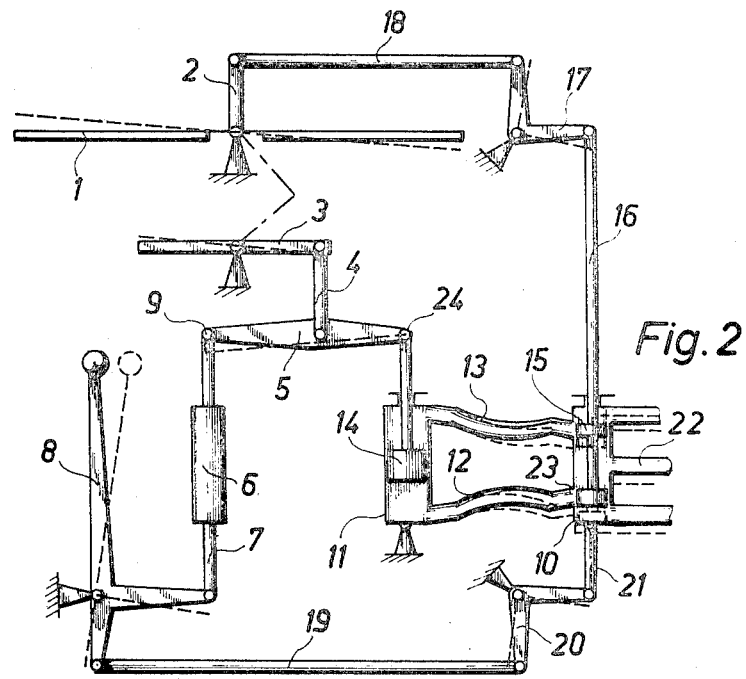
FIG. 2 shows the control device of the invention in one position of operation.
Figure 6:
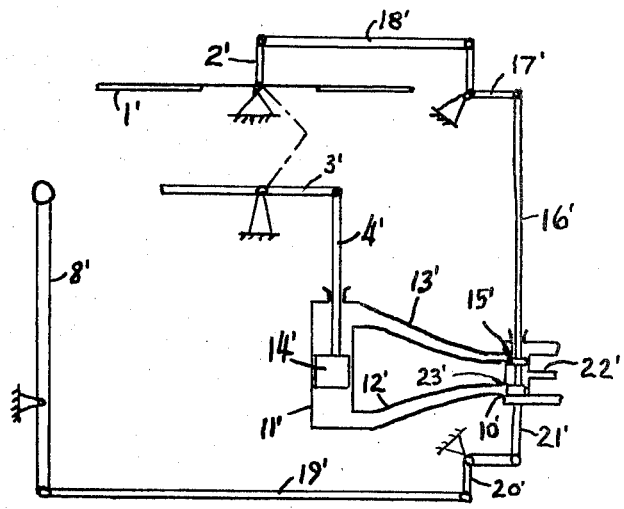

FIG. 6 shows a control device varying from FIGS. 2 and 4.

The control mechanism according to the present invention is characterized primarily in that on the lever side of the automatic control part a control valve is provided on the stationarily mounted pressure oil-working cylinder, said control valve communicating with a piston connected to the respective lever end while the connection of the control valve with the piston is effected by means of two hoses. The double piston valve and the control valve housing are movable relative to each other. The double piston valve is adapted by an intermediate linkage to be longitudinally displaced by means of a link member which is connected to the rotor shaft and follows the respective movements of inclination of the rotor shaft, while the control valve housing is displaceable by the manual control lever.

Inasmuch as when returning the rotor from an undesired inclined position, a certain overcontrol is rather advantageous, according to a further development of the present invention, it is suggested that for controlling beyond the rated value, the control valve housing has its central portion linked to a two-arm balance beam, and one end of said balance beam is through an extended piston rod connected to the working piston, whereas the manual control is connected to the other end of said balance beam.

In order to avoid the danger of an undesired overcontrol of the rotor driving very fast control movements of the control strick, according to a further development of the present invention, adjustable throttle valves are interposed in the oil conduits for the working cylinder and in the control housing for the valve.

For automatically stopping the automatic control part in case a break occurs in the oil conduits, an intermediate valve is provided in a connecting line between said oil conduits. This intermediate valve is closed when oil pressure prevails and opens automatically when no oil pressure prevails. Furthermore, in the pressure oil-working cylinder there is provided a working piston which at both sides is under the load of helical springs and which is provided with an annular groove which is engaged by a locking pin in case of a failure of the oil pressure, said locking pin being guided in the longitudinal central portion of the working cylinder. The locking pin pertains to a piston which is under the load of a pressure spring and is guided in a hydraulic cylinder. When oil pressure prevails, the last-mentioned piston with its locking pin is held back by the oil pressure.

Referring now to the drawings in detail, FIG. 1 shows the rotor 1 of a helicopter provided with the rod 2 which indicates the respective flapping angle $\alpha$ of said rotor. A swash-plate 3, in a manner known per se, controls the pitch angle of the rotor. The swash-plate 3 is operatively connected with the manual part of the control device through the intervention of the link 4 and the bridge 5 and furthermore is operatively connected to the control device according to the invention. The manual part of the control device comprises a power amplifier 6 known per se and indicated diagrammatically only, or the manual part comprises at least one unilaterally effective block or bar and the control stick 8 operatively connected to the piston rod 7 of the power amplifier 6. The power amplifier 6 is unilateral in the sense that forces originating with the swash-plate or with the rotor cannot act backwards onto the stick and thus cannot adjust the same. In other words, the pivot point 9 of the birdge 5 is a fixed point for the forces in the direction of the stick. The control device comprises a movable control valve 10 and a fixedly arranged motor 11. Control valve 10 and motor 11 are interconnected by means of flexible conduits 12 and 13. The piston 14 of the control motor is connected to the right-hand side of the bridge 5. The control piston 15 of the control valve 10 is connected to the rod 2 through the intervention of a bar 16, an elbow lever 17 and a rod 18. When the rotor occupies a horizontal position, which means that the flapping angle $\alpha$ equals zero, and thus the rod 2 occupies a vertical position, the control piston closes off the control slots in the valve. In these circumstances no oil under pressure can pass into the control motor.

The manual control and the control device are interconnected through the intervention of a rod 19, an elbow lever 20 and a rod 21. It may be assumed by way of example that when a disturbing force occurs or during the take-off, the rotor is tilted from its full-line position toward the right into the dash-line position with the flapping angle $\alpha$. The rod 2 will therefore point toward the right. As a result, the control piston 15 in the control valve 10 is moved downwardly. Consequently, the control valve directs the pressure oil from the pressure conduit 22 through slots in conduit 12 to the lower side of the working piston 14 in the control motor 11. The piston 14 is moved upwardly. Since the left-hand pivot point 9 of the bridge 5 with non-moved control stick is to be considered a fixed point, the swash-plate 3 will at the right be moved upwardly. As a result, the swash-plate imposes upon the rotor blades an adjustment of the pitch angle in a manner known per se which adjustment causes the plane of rotation of the rotor to return in the direction of the original position. At the same time also the rod 2 returns to its vertical position and the control piston 15 is moved upwardly through the intervention of the rod 18, elbow lever 17 and bar 16. The control piston 15 starts closing the control slot 23. In this way the swash-plate is moved by the working piston as long as the control piston 15 has returned to its starting position, whereby the control slot 23 is closed and the oil flow to the control motor is blocked. In this way also the rotor has returned to its horizontal starting position.

Once again a control procedure is cited to show that the control stick 8 is stationary and the rotor 1 is in the position represented by full lines in the drawings. Under influence of a disturbing force upon the rotor 1, the latter is in the position represented by dotted lines in the drawings. The disturbing force is transferred by way of the rod 2, rod 18, elbow lever 17 and bar 16 onto the control piston 15. Downward movement of the control piston 15 results and the control slot 23 is cleared, since the control valve 10 is fixed by way of rod 21, elbow lever 20, rod 19, and control stick 8. The working medium now flows from conduit 22 by way of control slot 23 and flexible conduit 12 against the underside of operating piston 14. Thereby the working medium presses the operating piston 14 upwardly and brings the bridge 5 into the dotted-line position, since pivot point 9 must be considered as fixed. This movement of the bridge 5 is transmitted by way of the link 4 onto the swash-plate 3 which then occupies the dotted-line position. The shift in position is transmitted from the swash-plate onto the rotor 1 in known manner and permits return thereof to the starting position. As soon as the angles of the swash-plate 3 and rotor 1 correspond, the control piston 15 closes the control slots 23. If the angle of the rotor 1 is overcontrolled, then the control piston 15 clears the control slot 23 with respect to the flexible conduit 13 and there is engagement of the operating piston 14 on the upper side thereof so that an equivalent control procedure occurs as described above.

Since the pivot points 9 of bridge 5 represents a fixed point for the forces in the direction of the stick, a change in the position of the bridge during the prescribed automatic control operation will remain without any influence upon the control stick so that the position of the latter remains unchanged.

On the other hand, the automatic control operation is not affected by a manual control operation. For instance, when the pilot moves the stick 8 toward the right (dash-line position in FIG. 2), the swash-plate 3 moves at the right downwardly through the amplifier 6 and the bridge 5. The rotor will in view of the imposed periodic blade adjustment also tilt to the right. The rod 2 will likewise tilt toward the right and will move the control piston 15 of valve 10 downwardly. At the same time, however, also the control valve 10 will move downwardly in view of the movement of the rod 19, elbow lever 20 and rod 21. If the control device is so designed that the movement of the control valve and the control piston are of the same magnitude, no relative movement will occur between the said two members 10 and 15.

The control slots 23 of the control valve 10 are thus not released and no pressure oil is conveyed to the control motor 11. The position of the working piston 14 in the control motor remains unchanged so that as far as the manual control operation is concerned, the right-hand point 24 of bridge 5 represents a fixed point. No change occurs in the respective automatically adjusted position. In other words, the manual control operation does not affect the automatic control operation. Both operations are completely independent of each other.

The overcontrol of the rotor will now be explained in connection with FIG. 3. The manual part of the control device is not shown inasmuch as it is immaterial as far as the explanation of the principle involved is concerned. Since the pivot point 9 of the bridge 5, as mentioned above, is during the automatic control operation to be considered as a fixed point, this point is shown as fixed joint point. In FIG. 3 a bridge 25 connects the control valve 10 and the extended piston rod 26 of the working piston 14. The bridge 25 is at 27 linked to the control valve through the intervention of rod 21.

When a disturbance occurs, the rotor will, for instance, be tilted to the right by an angle α whereby also the rod 2 is inclined toward the right (dash-line position). Thereupon the control piston 15 is moved downwardly. The control piston directs the oil under pressure through conduit 12 to the lower side of the working piston 14, and the piston 14 is moved upwardly.

Since the pivot point 9 during the automatic control operation is considered as a fixed point, the swash-plate 3 moves to the right and upwardly. The periodic angle adjustment of the blades inherent thereto permits the rotor to return to its normal position.

The movement of the working piston 14 in the adjusting motor 11 in upward direction is conveyed through bridge 25 to the control valve 10. The control valve 10 moves somewhat upwardly and by means of this movement increases its control slot 23. Oil under pressure is now conveyed to the bottom side of the working piston 14. The working piston through bridge 5 increases the leftward inclination of the swash-plate. The swash-plate thus forces upon the rotor an additional blade adjustment which returns the latter beyond the starting position. Thus, the rotor will occupy a somewhat leftwardly inclined position, namely, the dot-dash line position. Together with the rotor, also the rod 2 inclines toward the left, moves the control piston 15 somewhat upwardly, thereby compensating for the preceding upwardly directed movement of the control slide, and finally closes the control slot 23. The flow of oil under pressure to the working cylinder is interrupted and the rotor remains in its new over-controlled position (dot-dash position; beating angle β) as long as the disturbance lasts.

By changing the transmission ratio a/b of the bridge 25, the control degree can be varied within wide limits. The desired transmission ratio may be adjusted by the pilot during flight in a manner known per se aside from the present invention.

FIG. 4 shows the connection of the above-described overcontrol of the rotor with the manual blade angle control described above in the connection with FIGS. 1 and 2. The right-hand point 28 of bridge 25 is in this instance no longer a fixed point in contrast to FIG. 3, but is connected to the stick through the rod 29, elbow lever 20 and rod 19. The control takes place as described in connection with FIG. 3. The manual control takes place in conformity with the description of FIG. 2.

When the control device is so designed that, when considering the transmission ratio a/b of the balance beam 25, the movement of the control slide 10 is under the influence of a stick movement of precisely the same magnitude as the movement of its control piston 15 which, as mentioned above, is initiated by the rod 2, no relative movement between control valve and control piston will occur. Thus, the valve cannot direct any pressure oil to the adjusting motor 11, and the working piston 14 remains at rest. The left-hand point 30 of bridge 25 is thus during a stick movement a fixed point. The manual control, also in this instance, does not affect the control.

With a very fast stick movement, the independence of the manual control and control device could be lost and cause considerable rotor oscillations. The rotor requires a certain time corresponding to a number of revolutions to adjust itself to a control order. It takes a correspondingly long time until the control piston 15, through the rod 2 and the lever system 18, 17, 16 has adapted itself to said order with regard to its position. With a very fast stick movement, for instance, toward the right (FIG. 2), the control valve 10 is at the same speed moved downwardly. In view of a delay in the adjustment of the control piston 15, the otherwise existing zero relative movement between piston and valve is not retained. Oil under pressure is conveyed through conduit 13 into the adjusting motor which latter, in a manner known per se, adjusts the blade angle of the rotor and, more specifically, in the same direction as determined by the stick movement.

There exists the danger that the rotor is overcontrolled to an undesired extent and that oscillations occur. In order to obviate this possibility, delaying elements, as for instance throttle valves 31, 32, are built into the conduits 12, 13 as clearly shown in FIG. 4. These throttle valves cause a delayed entry of the pressure oil into the adjusting motor 11 so that the working piston will not be actuated prior to the rotor having had time to adjust to the controlled position. In addition to the throttle valves 31, 32 also a throttle valve 33 may be arranged in the common conduit 22.

The power amplifier 6 is not necessary under all circumstances in order to obtain the described control effect. In FIGS. 2 and 4, the amplifier 6 and bridge 5 may be omitted; then, without interposition of bridge 5, the working piston 14' may be directly connected to the swash-plate 3'. Referring to FIG. 6 having reference numerals primed with respect to corresponding components, with a movement of stick 8', the control valve 10' is adjusted, the respective control slots are freed, and pressure oil is directly conveyed into the control motor. The swash-plate 3' moves to an inclined position and with the latter also the plane of rotation of the rotor and the rod 2', which moves the control piston until the control slot is again closed. The rotor has reached its controlled position. In each manually controlled position, the control device can work independently and can compensate for each disturbance.

If, with the examples shown in FIGS. 1 to 4, the hydraulic oil would fail, it might happen that the working piston 14 and thereby the swash-plate 3 become guideless. A reliable connection between the stick position and the position of the swash-plate will thus no longer prevail, and the aircraft does no longer unequivocally follow the stick movements of the pilot. In order to prevent such a behavior, according to FIG. 5, the conduits 12 and 13 are interconnected through a pressure sensitive valve 34. This valve, which is known per se, is closed when oil pressure prevails and is automatically opened when the oil pressure fails.

Furthermore, according to the present invention, the working piston 35 of the control motor 36 is arranged between springs 37 and 38 and is provided with an annular groove 39. When oil pressure prevails, a piston 40 with a pin 41 is pressed by the oil pressure in a pressure conduit 42 toward the right so that the pin frees the working piston. If no oil pressure prevails in conduit 22, a spring 43 in a cylinder 44 of a device 45 presses the piston 40 toward the left so that the pin 41 thereof engages the annular groove 39 of the working piston. The working piston is thus arrested in its intermediate position, and the pivot point 24 of the bridge 5 has become a fixed point. In this way the control device according to the present invention is functionally separated from the swash-plate, and the manual control is oriented unequivocally.

It is, of course, to be understood that the present invention is not limited to the specific modifications shown in the drawings and is defined solely by the appended claims.

What I claim is:

1. A control device for helicopters comprising rotor blades and being provided with a manually operable control system and an automatic control system and with swash plate means operable by said control systems and operatively connected to said rotor blades for adjusting said blades, which includes: a two-arm balance lever, link means having one portion thereof linked to said swash plate means and having another portion linked to the central portion of said balance lever, a pressure fluid operable control motor forming part of said automatic control system and including a control cylinder and a piston reciprocable in said cylinder and provided with piston rod means linked to one arm of said balance lever, a control valve comprising a movable valve housing communicating with opposite sides of said piston and having fluid inlet and outlet means for admitting fluid to and releasing fluid from opposite sides of said piston, a valve spool reciprocable in said valve housing for controlling said inlet and outlet means and the communication of said valve housing with said control cylinder, a first linkage system operatively interconnecting said valve spool and said rotor blades, manually operable control means forming part of said manually operable control system, a link connection operatively connecting said manually operable control means to the other arm of said balance lever, and a second linkage system operatively interconnecting said manually operable control means and said movable valve housing.

2. A control device according to claim 1, in which said piston rod means has two sections respectively arranged on opposite sides of said piston with one section pivotally connected to said one arm of said balance lever, and in which said second linkage system includes a two-arm lever pivotally supported by a stationary support and pivotally connected to the other section of said piston rod means.

3. A control device according to claim 1, in which said piston rod means has two sections respectively arranged on opposite sides of said piston with one section pivotally connected to said one arm of said balance lever, and in which said second linkage system includes a two-arm lever having one end portion linked to the other section of said piston and having the other end portion operatively connected to said manually operable control means while an intermediate portion of said last mentioned two-arm lever is operatively connected to said valve housing.

4. A control device according to claim 1, which includes first and second flexible conduit means for establishing communication between said valve housing and said control cylinder, and adjustable automatic throttle valve means interposed in said first and second flexible conduit means and operable to block said communication in response to a fluid pressure failure in the respective normally pressure fluid supplying conduit means.

5. A control device according to claim 1, which includes a feeding line for feeding pressure fluid into said control valve housing, and which includes throttle valve means interposed in said feeding line and operable in response to a failure of the pressure in said feeding line to close communication between the latter and said valve housing.

6. A control device according to claim 4, which includes a main pressure fluid feeding line leading into said valve housing, a connecting line between said first and second flexible conduit means, a normally closed intermediate valve interposed in said connecting line and operable in response to a failure in fluid pressure in said main feeding line to establish communication between said first and second conduit means, an additional cylinder, an additional piston reciprocable in said additional cylinder, said additional piston having a piston rod extending into said control cylinder, spring means acting upon one side of said additional piston and continuously urging the same to move the piston rod of said additional piston into said control cylinder, further spring means acting upon said control piston and continuously urging the latter to occupy a position opposite said piston rod of said additional piston, said control piston being provided with an annular groove, said further spring means being operable in response to the establishment of fluid communication between both sides of said control piston to move said control piston into a position in which said annular groove is in alignment with the piston rod of said additional piston, and conduit means establishing communication between said main feeding line and the other side of said additional piston for causing the latter in response to the normal pressure in said main feeding line to maintain said piston rod of said additional piston disengaged from said annular groove.

References Cited

UNITED STATES PATENTS

| 3,050,276 | 8/1962 | Wissinger. |
| 3,256,780 | 6/1966 | Riley et al. ____ 170—160.25 X |

FOREIGN PATENTS

| 738,848 | 7/1966 | Canada. |
| 868,199 | 5/1961 | Great Britain. |
| 926,559 | 5/1963 | Great Britain. |

EVERETTE A. POWELL, Jr., Primary Examiner

U.S. Cl. X.R.

416—31, 102